FIG. 1B

INVENTOR.
Walter B. Kirk
BY
A. A. Steinmiller
Attorney

United States Patent Office 3,175,869
Patented Mar. 30, 1965

3,175,869
FLUID PRESSURE BRAKE CONTROL APPARATUS WITH ACCELERATED RELEASE AFTER SERVICE APPLICATION
Walter B. Kirk, Pitcairn, Pa., assignor to Westinghouse Air Brake Company, Wilmerding, Pa., a corporation of Pennsylvania
Filed July 21, 1961, Ser. No. 125,862
16 Claims. (Cl. 303—33)

This invention relates to fluid pressure brake apparatus for railway cars and trains in which is employed the well-known AB type of control valve device carried locally on each car for effecting application and release of the brakes on the corresponding car responsively to variations of pressure in a brake pipe which extends from car to car through the train, and has particular relation to means for upgrading existing AB control valve devices to provide improved brake performance especially in regard to acceleration of the release of the brakes following a service application.

It is characteristic that in a brake system for a long train of railway freight cars, for example of the order of 150 cars in length, the existing form of AB control valve device operates in such a manner that a definite time delay of approximately fifty seconds occurs following the initiation of a recharging of the brake pipe pressure by operation of the brake valve on the locomotive, subsequent to a service brake application, before movement of the service slide valve of the AB control valve devices to a brake release position occurs. In the case of a long train of cars traveling at speeds under twenty miles per hour, such characteristic time delay in the movement of the service slide valve of the existing AB control valve device to a brake release position necessitates that the train of cars be brought to a complete stop before effecting a release of the brakes and thereafter proceeding at a slow speed. This involves delays in operating schedules.

More recently an improved form of control valve device, commonly known as the AC control valve, has been devised for providing improved brake control performance particularly in respect of effecting an accelerated release of the brakes following a service application so that even on a long train of freight cars it is possible to release the brakes sufficiently rapidly to enable the train to maintain sufficient momentum as to continue at slow speed without actually coming to a complete stop.

In view of the cost of replacement, it is impracticable for railroads to discard existing AB control valves and replace them with the new AC control valve device. It is desirable, therefore, that means be provided for upgrading existing forms of the AB control valve to provide improved brake control performance in respect to accelerated release of the brakes following a service brake application.

It is accordingly a prime object of this invention to provide a means for upgrading existing AB control valve devices to add thereto the operating feature of accelerated release following a service brake application.

It is a further object of this invention to provide for upgrading of existing AB control valve devices in the manner indicated in the foregoing object and at the same time provide a release insuring function heretofore provided in the existing AB valve by a so-called "release-insuring valve," thereby enabling the elimination of the latter and generally simplifying the servicing of the control valve as a whole.

According to the invention, upgrading of the existing AB control valve device to provide the accelerated release function as well as the release insuring function is effected in the illustrated form of the invention disclosed herein by means of a valve device embodied in a filling piece which can be disposed between the customary pipe bracket portion and service portion of the existing AB control valve device with a minimum of expense or skill on the part of personnel performing the upgrading operation. More specifically, the means provided for upgrading existing forms of the AB control valve device includes a fluid pressure operated valve mechanism illustratively shown and described herein as including a piston of the diaphragm type which through a follower and stem actuates a disc-type valve and a spool-type valve. The diaphragm piston is subject opposingly through passages provided in the filling piece to brake pipe pressure and auxiliary reservoir pressure and is effective in response to a slight increase in brake pipe pressure above auxiliary reservoir pressure, subsequent to a service brake application, to operate the valve portion thereof to establish a communication between the emergency reservoir and the brake pipe through which fluid under pressure at the then higher pressure in the emergency reservoir is conveyed to the brake pipe, thereby to accelerate the recharging of the brake pipe to the normal pressure carried therein and thereby to accelerate the response of the service slide valve, of the AB valve devices on the cars throughout the train, to its brake release position. In addition, the accelerated release valve mechanism embodied in the filling piece as previously mentioned also operates in response to a slight increase in brake pipe pressure following a service application of the brakes to effect a reduction in the auxiliary reservoir pressure, thereby further reducing the time required to establish a differential of brake pipe pressure over auxiliary reservoir pressure on the main service slide valve piston of the AB control valve for the purpose of returning the service slide valve from its service lap position to its release position.

By means of the accelerated release valve mechanism added to existing forms of AB control valves, it is therefore possible to provide an accelerated release function thereto which enables the AB valve devices to be employed for the full service life thereof while performing with improved brake operating characteristics without the necessity of replacement by costly new valve devices of the AC or other type.

It has also heretofore been proposed to upgrade existing AB control valve devices by providing a diaphragm-type piston arrangement in place of the customary ring-type piston for the main service valve portion of the AB valve device. Such upgrading modification has involved the inclusion of two filling pieces between which the diaphragm piston is clamped, the two adjacent filling pieces being disposed between the usual pipe bracket portion and the service valve portion of the AB valve device.

It is a further object of the present invention to provide an accelerated release valve mechanism embodied in a filling piece member which simultaneously serves the purpose of attachment of the improved form of diaphragm piston to the existing AB control valve, thereby enabling simplification and compact arrangement of the parts of the upgraded AB control valve.

The above objects and purposes are accomplished in a manner illustratively shown in the accompanying drawings wherein.

DESCRIPTION

Figure 1A:
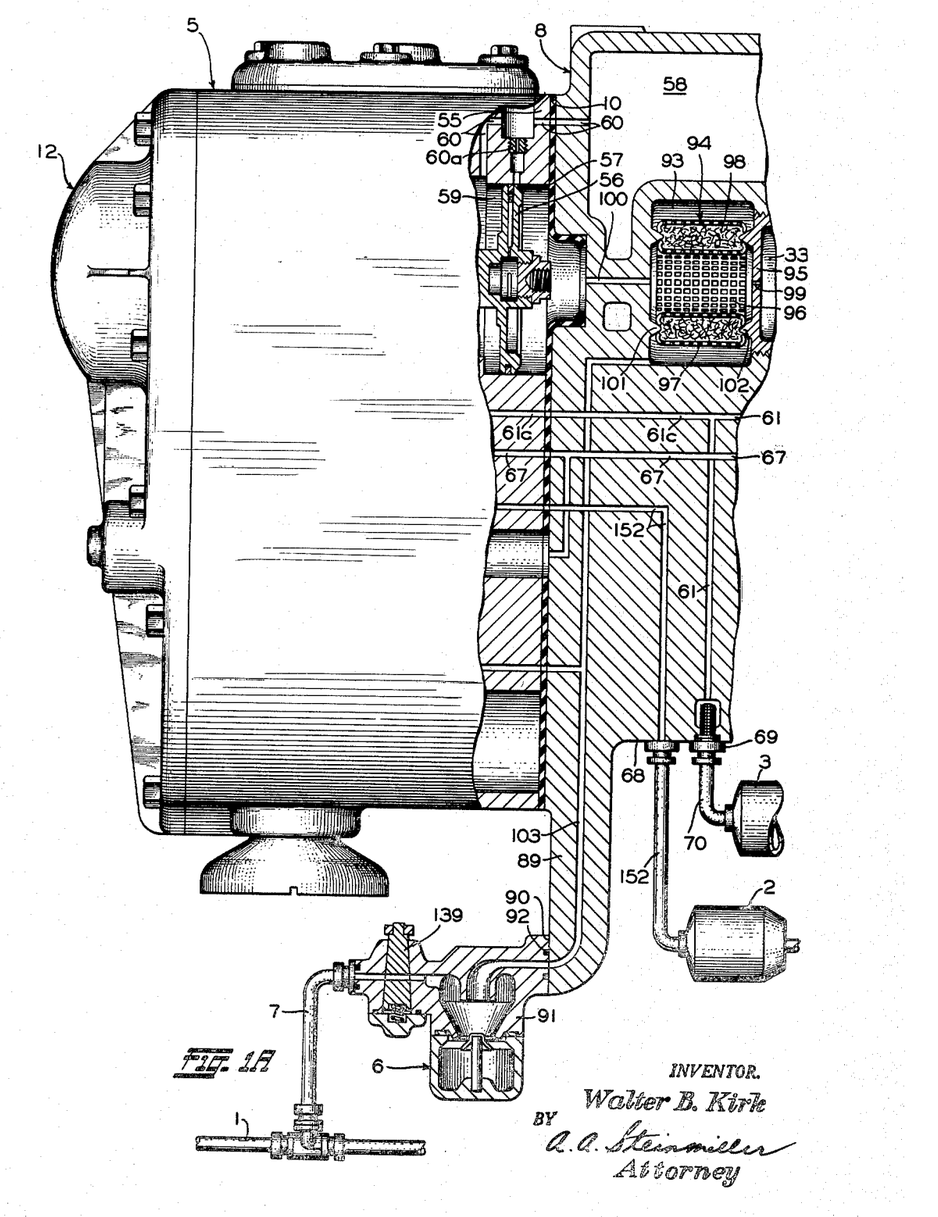
FIG. 1A and FIG. 1B, taken together, constitute a diagrammatic view mainly in section of an improved AB valve device embodying the invention and also a diaphragm type of service piston, showing the various parts thereof in normal release position.
Figure 1B:
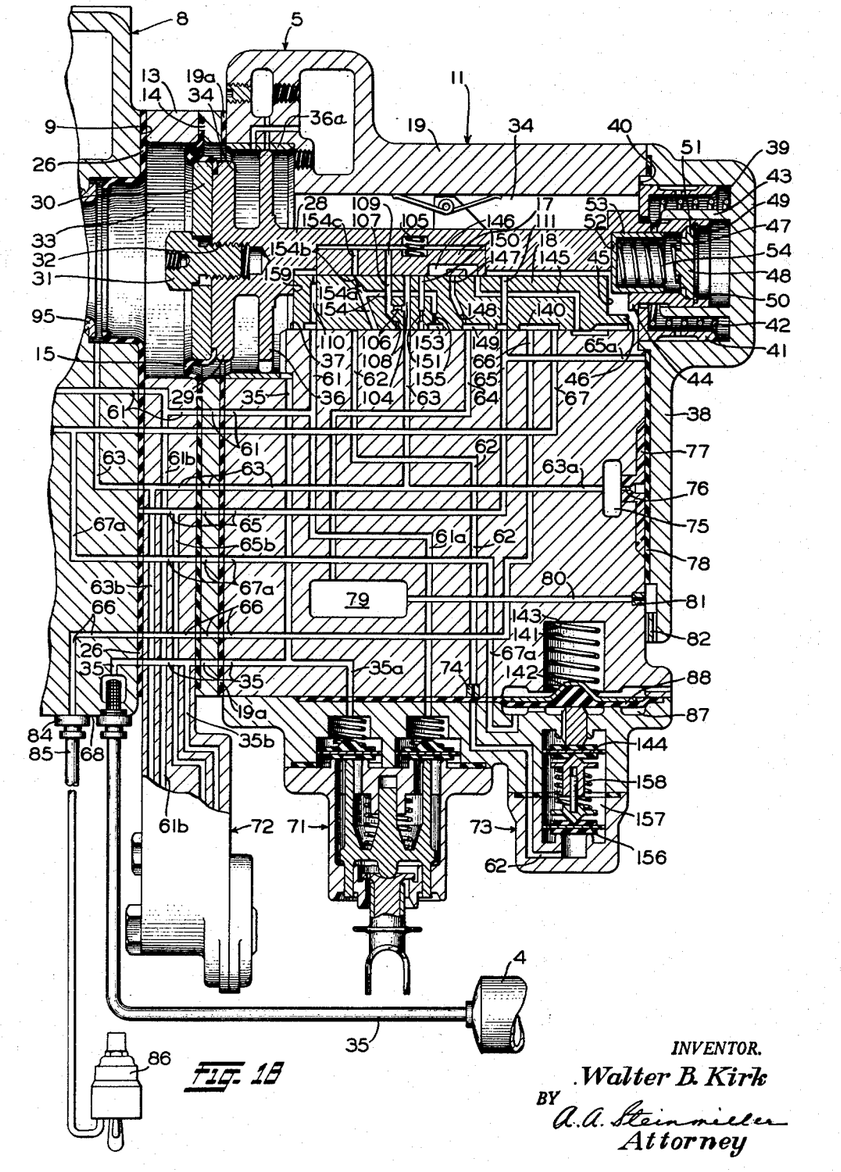

As shown in FIGS. 1A and 1B of the drawings, when the right-hand edge of FIG. 1A is placed alongside of the left-hand edge of FIG. 1B, an improved freight car fluid pressure brake equipment embodying the invention comprises a brake pipe 1 that extends from one end of the car to the other, a brake cylinder device 2, an emergency or supplemental reservoir 3, an auxiliary reservoir 4, and a brake controlling valve device 5 connected to the brake pipe 1 through a combined cut-out cock and centrifugal dirt collector 6 and a branch pipe 7.

The brake controlling valve device 5 may comprise a pipe bracket 8 having gasket faces 9 and 10 disposed opposite each other and further comprising a service or triple valve device or portion 11 and an emergency valve device or portion 12. The parts described above are standard components of the well-known AB freight car brake equipment now used on the freight cars of most American railroads.

According to the invention, the well-known AB freight car brake equipment is modified by inclusion of a filter piece having a valve device for providing an accelerated release function and by inclusion of another filler piece and a diaphragm type of piston in place of the ring type of piston formerly used in the service portion of existing AB valve devices. To accomplish this modification, the service portion 11 is removed from the pipe bracket 8, after which the existing graduating valve, service slide valve, two reservoir charging chokes arranged in parallel, and ring type of piston in the service portion 11 are removed therefrom.

Figures 2, 3, 4:
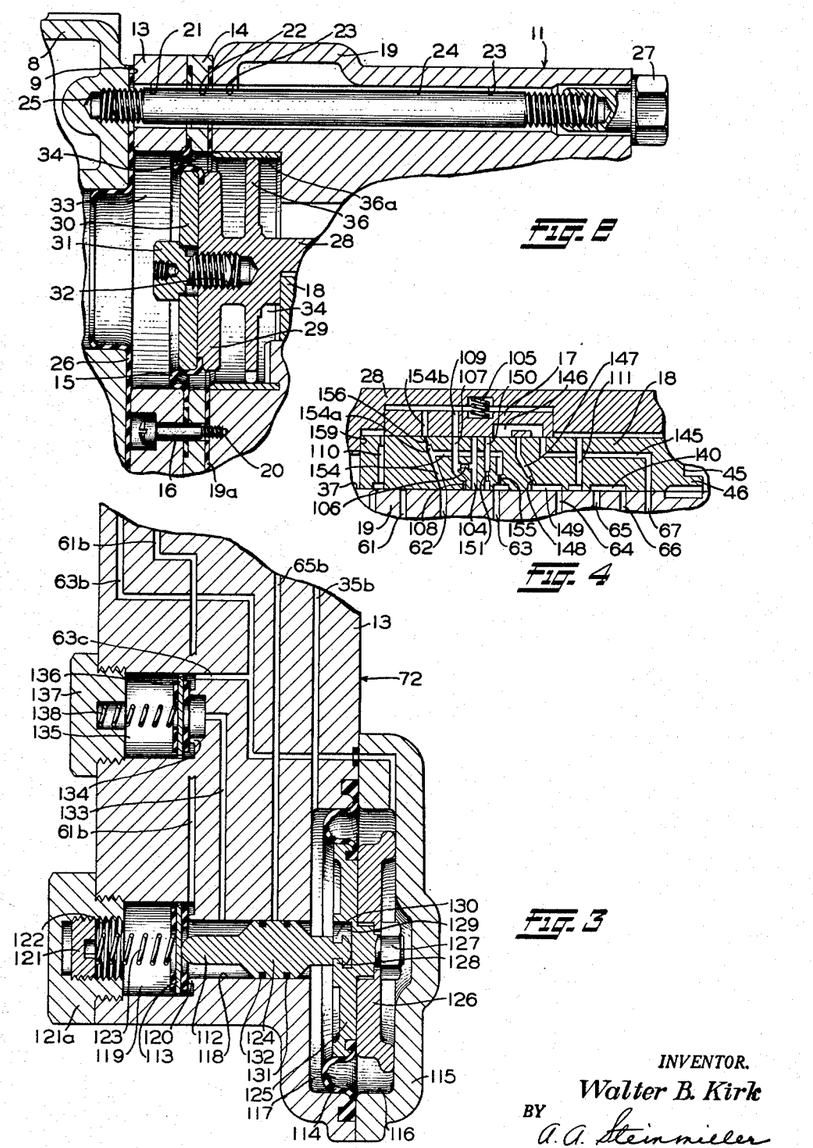
FIG. 2 is a partial sectional assembly view of the improved AB valve device shown in FIGS. 1A and 1B showing details of the securing means used to secure the two filling pieces to the service portion of the improved AB valve device and the securing means used to fasten the service portion, together with the filling pieces, to the pipe bracket.
FIG. 3 is a diagrammatic view, on an enlarged scale, of the accelerated release valve device that is included in the control valve device of the present invention, which accelerated release valve device is shown in outline in FIG. 1B.
FIG. 4 is a fragmentary sectional diagrammatic view of the service graduating slide valve and service slide valve of the service portion of the modified AB valve device in the position in which they will be in relation to the service slide valve seat when they have moved from their normal release position to their service lap position.

Subsequent to the removal thereof, the graduating valve, service slide valve and ring type of piston of the service portion 11 of the well-known AB brake controlling valve device are replaced by an assembly that comprises two filling pieces 13 and 14, a diaphragm or diaphragm type of piston 15 having its outer periphery clamped between the adjacent faces of the filling pieces 13 and 14 by a plurality of circumferentially spaced cap screws 16 only one of which is shown in FIG. 2, a new graduating valve 17 and a new service slide valve 18.

The service valve device 11 comprises a body or casing 19 which, subsequent to removal from the pipe bracket 8 to effect the modification of the well-known AB freight car brake equipment to include the new graduating and service slide valve, the accelerating release valve device and the diaphragm type of piston, is provided with a plurality of spaced-apart tapped and threaded counterbores 20 (FIG. 2) for receiving the threaded ends of corresponding cap screws 16, which cap screws extend through the filling pieces 13 and 14. Consequently, the cap screws 16, in addition to clamping the outer periphery of the diaphragm type of piston 15 between the adjacent faces of the filling pieces 13 and 14, also serve to secure these filling pieces to the casing 19 of the service valve device 11 there being a gasket 19a interposed between the adjacent clamping or gasket faces of the casing 19 and the filling piece 14, respectively.

The filling pieces 13 and 14 are respectively provided with a plurality of registering bores 21 and 22 which are arranged coaxially with a plurality of bores 23 in the casing 19 which bores 23 receive corresponding studs 24 threaded at each end.

In the existing form of AB valve device, one end of the studs 24 is screw-threaded into corresponding screw-threaded counterbores 25 formed in the pipe bracket 8 and the other end received a nut which, when tightened, clamped the casing 19 to the gasket face 9 on the pipe bracket 8, there being a gasket 26 interposed between the clamping face of the casing 19 and the gasket face 9 of the pipe bracket 8.

Subsequent to securing the filling pieces 13 and 14 to the casing 19 by the cap screws 16, this assembly is secured to the pipe bracket 8 by sliding the assembly over the studs 24 until the left-hand face of the filling piece 13 comes into contact with the right-hand face of the gasket 26 which is retained. The assembly is then forced against the gasket 26 to form a seal therewith by applying a specially designed nut 27 to that end of each stud 24 that is within the right-hand end of each bore 23 in the casing 19, it being understood that, due to the interposition of the filling pieces 13 and 14 between the pipe bracket 8 and the casing 19, the ends of the studs 24 will no longer protrude from the casing 19 to receive the nuts formerly used.

The inner periphery or center of the diaphragm 15 (FIG. 1B) is operatively connected to one end of a new valve operating or service piston stem 28 having at one end a first diaphragm follower 29 by means such as a second diaphragm follower 30 and a cap screw 31 extending through the second diaphragm follower and having screw-threaded engagement with a threaded counterbore 32 in the end of the stem.

The diaphragm 15 cooperates with the pipe bracket 8, filling pieces 13 and 14, and the casing 19 to form within the brake controlling valve device 5 and on the respective opposite sides of the diaphragm 15, two chambers 33 and 34. The chamber 34 contains the new stem 28 which is adapted to operate the new graduating valve 17 and new service slide valve 18 also contained in the chamber 34 which chamber is connected to the auxiliary reservoir 4 through a passageway 35 extending through the body 19, the filling pieces 14 and 13, the pipe bracket 5 and a pipe bearing the same numeral.

The valve operating stem 28 is provided adjacent the first diaphragm follower 29 with a disc-like guide member 36 which is slidably mounted in a bushing 36a (see FIGS. 1B and 2) in which bushing the formerly used ring type of piston was slidably mounted. The purpose of the guide member 36 is to give a stabilizing effect to the diaphragm 15 and prevent the service slide valve 18 from being raised from its seat by fluid under pressure in the ports opening at the surface of a slide valve seat 37 upon which the slide valve 18 is slidably mounted.

The chamber 34 is closed by a new cap or back cover 38 which replaces the cap or back cover formerly used on the service valve portion 11 of the well-known AB brake controlling valve device 5 since, as will be made apparent hereinafter, the addition of the accelerating release valve device according to the present invention enables the removal of the relase insuring valve which is housed in the back cover that is secured to the casing 19 of the service portion 11 of the brake controlling valve devices 5 commonly found on most railway freight cars in the United States. The new cap or back cover 38 is secured to the casing 19 in any desired manner and has a recess 39 therein which defines the back end portion of the chamber 34. This recess 39 is of greater diameter than that of the major portion of the chamber 34 and due to this, the right-hand end of the casing 19 forms a stop shoulder 40 against which a stop member 41, slidably mounted in the cap 38, is adapted to abut to limit inward movement of the stop member 41. Interposed between the stop member 41 and the cap 38 is a spring 42 which at all times tends to move or bias the stop member 41 toward the stop shoulder 40.

The right-hand end portion of the piston stem 28 extends through a central opening in the stop member 41 and is slidably guided in an annular lug 43 preferably formed integral with the cap 38 and extending into the chamber 34. This lug 43, besides serving to guide the right-hand end of the piston stem 28, also serves to maintain the spring 42 against undue movement from its central position in the recess 39 in the cap 38. The piston stem 28, at a point located a short distance inwardly from its right-hand end, is provided with an operating collar or lug 44, one side of which is adapted to contact the stop member 41 and the other side of which is adapted to operatively contact a right-hand end surface 45 of the service slide valve 18.

The service slide valve 18 is provided with a lug 46 extending from the right-hand end thereof which lug 46 is adapted to contact the stop member 41 when the parts of the service valve portion 11 are being moved from an inner or retarded release postion to an outer or normal release position in which they are shown in FIG. 1B and vice versa. As shown in FIG. 1B of the drawing, there is a slight clearance between the end of the lug 46 and the stop member 41 when the lug 44 on the stem 28 is in contact with the member 41, so that when the parts of the service valve portion 11 are moved from their normal release position in which they are shown in FIG. 1B of the drawings to their inner position, the spring 42 does not act directly on the service slide valve 18 to resist rightward deflection of the diaphragm 15 but does act directly on the position stem 28. Due to this, there can be no tendency of the spring 42 to act to raise the service slide valve 18 from its seat 37. It will also be seen that when the parts of the service valve portion 11 are being moved from the inner release position, the spring 42 acts to move the piston stem 28 relative to the service slide valve 18 until the slight clearance is taken up and then acts to move the stem and service slide valve in unison. It will thus be seen that the diaphragm 15 does not offer any resistance to the forward or left-hand movement of the service slide valve 18 so that there will be no tendency of the slide valve 18 to rise from its seat 37, which tendency would be present if the diaphragm 15 were shifted or deflected through the medium of the service slide valve 18.

The right-hand end portion of the valve operating stem 28 is provided with a bore 47 which is closed at one end by a shouldered plug 48 that is retained in a counterbore 49 coaxial with the bore 47 by a snap ring 50 that is inserted in a groove 51 formed in the counterbore 49. The inner end wall of the bore 47 forms a stop shoulder 52 adapted to act as a stop for a plunger 53 which is slidably mounted within the bore 47. Interposed between the plunger 53 and the shouldered plug 48 is a spring 54 which acts to normally maintain the plunger 53 in contact with the stop shoulder 52 at the inner end of the bore 47. In this position, the end or face of the plunger 53 will be closer to the right-hand end surface 45 of the service slide valve 18 than will be the left-hand face of the collar 44 of the piston stem 28, so that in effecting an application of the brakes the plunger 53 will move into contact with the service slide valve 18 and yieldably resist, by reason of the spring 54, relative movement of the diaphragm 15 and graduating valve 17 before the collar 44 on the stem 28 contacts the service slide valve 18. The purpose of this is to stabilize the action of the parts of the service portion 11, as will hereinafter more fully appear. This stabilizing mechanism also serves as a graduating spring for shifting the diaphragm 15, stem 28 and graduating valve 17 to service lap position.

There is described and claimed in Patent No. 2,031,213, issued February 18, 1936, to Clyde C. Farmer and assigned to the assignee of the present application, a fluid pressure brake equipment for railway freight cars having a brake controlling valve device that comprises a pipe bracket having two oppositely disposed parallel faces to which are respectively secured an emergency valve device and a service valve device.

The emergency valve device 12 shown in FIG. 1A of the drawings is substantially the same in construction and operation as the emergency valve device described in the above-mentioned patent. Since reference may be had to the patent for a complete description of the structure and operation of the emergency portion, it is deemed unnecessary to show and describe it in detail herein. Briefly, however, the emergency valve device 12 comprises a sectionalized casing 55 having a bore in which is sildably mounted a ring type of emergency piston 56 subject opposingly on its opposite sides to brake pipe pressure in a chamber 57 at the right-hand face of the piston 56, and to the pressure in a quick action chamber 58 formed in the pipe bracket 8 and connected to a chamber 59 at the left-hand face of the piston 56 through a passageway 60 that extends through the pipe bracket 8 and the sectionalized casing 55. The chamber 57 is normally open to the passageway 60 through a choke plug 60a. Operatively connected to the emergency piston 56 is an emergency graduating valve (not shown) and an emergency slide valve (not shown) for respectively controlling the release of fluid under pressure from the quick action chamber 58 to atmosphere and the supply of fluid under pressure from the emergency reservoir 3 to the brake cylinder 2 in response to variations in brake pipe pressure, as fully described in detail in the above-mentioned Farmer patent.

The casing or body of the service valve device, described in the above-mentioned Farmer patent, is substantially the same in construction as the casing or body 19 of the service valve device 11, shown in FIG. 1B of the drawings, which body 19, as hereinbefore mentioned, is the body of the service portion of the well-known AB valve device.

As shown in FIG. 1B of the drawings, there are seven passageways opening through respective corresponding ports at the face of the slide valve seat 37, the passageways and ports being respectively designated by the numerals 61, 62, 63, 64, 65, 66 and 67.

The port 61 is connected by its correspondingly numbered passageway in the slide valve seat 37, the body 19 of the service valve device 11, the filling pieces 14 and 13, and the pipe bracket 8 to a port opening at a face 68 on the bottom of pipe bracket 8 to which face 68 a flange fitting 69 is secured and into which fitting is received one threaded end of a pipe 70 connected at its opposite end to the emergency reservoir 3.

A first branch passageway 61a in the body 19 connects the passageway 61 to a reservoir release valve device 71 which reservoir release valve device may be substantially the same as that shown and described in detail in the above-mentioned Patent No. 2,031,213 to Farmer.

A second branch passageway 61b in the filling piece 13 connects that portion of the passageway 61 therein to a valve device 72, the body of which is formed integral with the filling piece 13.

A third branch passageway 61c (see FIG. 1A) in the pipe bracket 8 connects that portion of the passageway 61 in the pipe bracket to a corresponding branch passageway 61c in the sectionalized casing 55 of the emergency valve device 12, shown in FIG. 1A of the drawings.

The port 62 is connected by its correspondingly numbered passageway in the slide valve seat 37, and the body 19 of the service valve device 11 to the inlet of a quick service modifying or limiting valve device 73, which quick service limiting valve device may be substantially the same as that shown and described in the above-mentioned Farmer patent. This passageway 62 has a choke plug 74 interposed therein to control the rate of flow of fluid under pressure therethrough to the limiting valve device 73.

The port 63 is connected by its correspondingly numbered passageway in the slide valve seat 37, the body 19 of the service valve device 11, the filling pieces 14 and 13, and the pipe bracket 8 to a port opening into that portion of the chamber 33 that is in the pipe bracket 8.

A first branch passageway 63a in the body 19 connects the passage 63 to a volume chamber 75 also in the body 19. The volume chamber 75 was heretofore open through a choke 76 in a release insuring valve diaphragm stop 77 to one side of the diaphragm of a release insuring valve device that was embodied in the formerly used cap or back cover which in the modification hereinbefore mentioned of the well-known AB valve device is replaced by the new back cover 38. In the modified structure, shown in FIG. 1B of the drawings, a gasket 78 interposed between the right-hand end of the body 19 and the back cover 38 blanks off or closes the outlet of the choke 76.

A second branch passageway 63b which is in the filling piece 13 connects that portion of the passageway 63 therein to the valve device 72.

The port 64 is connected by its correspondingly numbered passageway in the slide valve seat 37 and the body 19 to a quick service volume chamber 79 in the body 19, which volume is constantly open to the atmosphere through a passageway 80, a choke plug 81 interposed in the latter passageway, and an insect excluder 82 formed integral with the back cover 38 adjacent the outlet of the choke plug 81.

The port 65 is connected by its correspondingly numbered passageway in the slide valve seat 37, the body 19, the filling pieces 14 and 13 to a port opening at that face of the filling piece 13 that is adjacent the gasket face 9 of the pipe bracket 8 which port is closed or blanked off by the gasket 26 interposed between the adjacent clamping or gasket face of the filling piece 13 and the gasket face 9 of the pipe bracket 8, respectively.

A first branch passageway 65a in the body 19 connects the passageway 65 to a port opening at that face of the body 19 that abuts the gasket 78, which port is closed by this gasket which is interposed between the body 19 and the new back cover 38.

A second branch passageway 65b in the filling piece 13 connects that portion of the passageway 65 therein to the valve device 72.

The port 66 is connected by its correspondingly numbered passageway in the slide valve seat 37, the body 19, the filling pieces 14 and 13, and the pipe bracket 8 to a port opening at the face 68 on the pipe bracket 8 to which face a flange fitting 84 is secured and into which fitting is received one threaded end of a pipe 85 connected at its opposite end to a pressure retaining valve device 86 of the usual well-known construction, having a cut-out position in which fluid under pressure is adapted to be completely vented from the brake cylinder device 2 and also having a cut-in position in which it operates in the usual manner in releasing the brakes to retain a predetermined pressure in the brake cylinder device 2.

The port 67 is connected by its correspondingly numbered passageway in the slide valve seat 37, the body 19, the filling pieces 14 and 13, the pipe bracket 8, and the sectionalized casing 55 of the emergency valve device 12 to a timing valve (not shown) in the emergency valve device 12, which timing valve is the same as that shown and described in detail in the aforesaid patent to Farmer.

A first branch passageway 67a (see FIG. 1B) in the pipe bracket 8 connects that portion of the passageway 67 in the pipe bracket to a corresponding branch passageway 67a in the filling pieces 13 and 14 and the body 19. That portion of the branch passageway 67a in the body 19 is open at one end to a chamber 87 below a diaphragm 88, the outer periphery of which is clamped between the body 19 and the hereinbefore mentioned quick service limiting valve device 73 by any suitable means (not shown).

The hereinbefore-mentioned passageway 35 in the body 19 has a first branch passageway 35a in the body 19 that connects the passageway 35 to the hereinbefore-mentioned reservoir release valve device 71.

A second branch passageway 35b which is formed in the filling piece 13 connects that portion of the passageway 35 therein to the valve device 72.

In order that the emergency reservoir 3 and the auxiliary reservoir 4 may be charged with fluid under pressure from the brake pipe 1, the pipe bracket 8 is provided with an extension 89 having a clamping face 90 to which is secured a casing 91 of the combined centrifugal dirt collector and cut-out cock device 6, there being a resilient gasket ring 92 interposed between the casing 91 of the device 6 and the clamping face 90 of the pipe bracket 8.

Formed in the pipe bracket 8 are a plurality of fluid conducting passageways which are open to the several clamping faces of the bracket where they are adapted to register with corresponding passageways formed in the filling piece 13, the sectionalized casing 55 of the emergency valve device 12 and the combined cut-out cock and centrifugal dirt collector 6.

There is also formed in the pipe bracket 8 a chamber 93 open at one end and containing a strainer device 94 which is inserted through the open end of the chamber, and which is secured to the pipe bracket 8 by means of a screw plug 95 having screw-threaded connection with the bracket. Such a strainer device is described and claimed in Patent No. 2,014,895, issued September 17, 1935, to Ellis E. Hewitt, which patent is assigned to the assignee of the present application. Briefly, however, the strainer device 94 comprises a perforated tubular retainer 96 and a perforated tubular retainer 97 which surrounds the retainer 96. The space between the retainers 96 and 97 is packed with hair 98 or any other material suitable for separating dirt, moisture or the like from a stream of fluid under pressure. The inner surface of the retainer 96 defines a passageway which is open to the chamber 33 at the left-hand side of the diaphragm type of piston 15 through a restricted port or choke 99 in the screw plug 95 and is also open to the emergency piston chamber 57 through a passageway 100 in the pipe bracket 8. The inner end wall of the chamber 93 is provided with an annular rig 101 and the screw plug 95 is provided with a similar rig 102 between which the strainer device 94 is clamped by the screw plug 95.

The brake pipe 1 is connected to the chamber 93 through the branch pipe 7, combined cut-out cock and centrifugal dirt collector 6, and a passageway 103 in the extension 89 and the pipe bracket 8.

It will be noted that with the service slide valve 18 and the graduating valve 17 in their outer or normal release position, as shown in FIG. 1B, fluid under pressure flows from the brake pipe 1 through the branch pipe 7, combined cut-out cock and centrifugal dirt collector 6, passageway 103, chamber 93, strainer device 94, and passageway 100 to the chamber 57. Likewise, the fluid under pressure that flows through the strainer device 94 also flows to the chamber 33.

The fluid under pressure thus supplied to the chamber 57 is effective on the right-hand face of the emergency piston 56 to operate the emergency valve device 12 to its release position in the manner fully described in the hereinbefore-mentioned patent to Farmer.

The fluid under pressure supplied to the chamber 57 flows therefrom through the choke plug 60a to the passageway 60 which is open at its respective opposite ends to the quick action chamber 58 in the pipe bracket 8 and the chamber 59 at the left of the emergency piston 56.

Consequently, the chambers 58 and 59 are charged to the normal brake pipe pressure carried in the train when the brakes are released.

It will here be noted that with the service valve device 11 in its outer or normal release position, as shown in FIG. 1B, fluid under pressure flows from the chamber 33 by way of the passageway 63 extending through the pipe bracket 8, filling pieces 13 and 14, and body 19 to the corresponding port in the slide valve seat 37 and thence through a first passageway 104 extending vertically through the service slide valve 18, the upper end of which passageway is blanked off or lapped by the graduating valve 17 which is biased against the upper face of the service slide valve 18 by a spring 105 interposed between the valve operating stem 28 and the upper side of the graduating valve 17. Intermediate its ends the passageway 104 in the service slide valve 18 is in communication via a choke 106 with in actual practice has a diameter of .0820 inch with a second passageway 107 that extends substantially vertically through the service slide valve 18. The lower end of the passageway 107 adjacent the service slide valve seat 37 is restricted and in actual practice constitutes a choke 108 having a diameter of .0465 inch. The purpose of the choke 108 is hereinafter made apparent.

While the service slide valve 18 and the graduating valve 17 occupy their outer or normal release position, as shown in FIG. 1B, the upper end of the passageway 107 in the service slide valve 18 is connected to the chamber 34 through a first passageway 109 extending vertically through the graduating valve 17. Therefore, the fluid under pressure that is conveyed from the brake pipe 1 to the passageway and port 63, as described above, will flow therefrom to the chamber 34 at a rate controlled by the size of the choke 106, through passageway 104, choke 106, passageway 107 nd passageway 109.

With the service slide valve 18 and the graduating valve 17 in their outer or normal release position, as shown in FIG. 1B of the drawings, fluid under pressure present in the chamber 34 flows therefrom through the passageway and pipe 35 to the auxiliary reservoir 4. From the chamber 34 fluid under pressure also flows to the emergency reservoir 3 by way of a restricted passageway 110 in the service slide valve 18, the port and corresponding passageway 61 in the body 19 with which port the passageway 110 registers at the seat 37 of the service slide valve 18, the corresponding passageways 61 in the filling pieces 14 and 13 and the pipe bracket 8, and the pipe 70, so that both the auxiliary reservoir 4 and the emergency reservoir 3 are charged with fluid up to brake pipe pressure. The restricted passageway 110 in the service slide valve 18 retards the rate of flow to the emergency reservoir 3, so that more fluid will flow toward the back end of the train than would be the case if the flow of fluid to this reservoir were at a fast rate.

The service slide valve 18 is provided with a third passageway 111 extending vertically therethrough, which passageway 111, when the service slide valve 18 occupies its outer or normal release position in which it is shown in FIG. 1B, establishes a communication through which fluid under pressure may be conveyed from the chamber 34 to the port and corresponding passageway 65 and thence through the branch passageway 65b to the valve device 72 in the filling piece 13, as hereinbefore mentioned.

As shown in FIG. 3 of the drawings, the valve device 72 comprises a casing section which is integral with the filling piece 13 and which embodies therein a fluid pressure operated supply valve mechanism and a release insuring valve mechanism operable to release fluid under pressure from the chamber 34 and the auxiliary reservoir 4 upon effecting a slight increase in the pressure in the brake pipe 1 subsequent to a service brake application until a sufficient differential of pressure is established to deflect the diaphragm 15 and move the service slide valve 18 of the service valve device 11 out of its service lap position in which it is shown in FIG. 4 of the drawings.

Considering the valve device 72 in greater detail, this valve device comprises two coaxially related valve members 112 and 113 operable by fluid pressure exerted on a diaphragm 114 operably connected to the member 112 and suitably clamped about its outer periphery to the filling piece 13 by a clamping cover 115 attached to the filling piece in any suitable manner.

Two chambers 116 and 117 are formed respectively at opposite sides of the diaphragm 114. Chamber 117 is connected by a bore 118 to a chamber 119. Contained in the chamber 119 is the valve member 113 which may be in the form of a disc which cooperates with an annular valve seat 120 formed on the filling piece 13 and surrounding the end of the bore 118 and projecting into the chamber 119. Interposed between the face of the valve member 113 and an adjustable spring seat 121 having screw-threaded engagement with a screw-threaded counterbore 122 formed in a screw plug 121a that closes the open end of the chamber 119 is a spring 123 for resiliently seating the valve member 113 on the annular valve seat 120 to normally close communication between chamber 119 and the bore 118.

The valve member 112 comprises a spool valve 124 slidably mounted in the bore 118. One end of the spool valve 124 extends into the chamber 117 and is connected centrally with the diaphragm 114. This connection comprises two diaphragm followers 125 and 126 and a nut 127 having screw-threaded engagement with a stem extending from the diaphragm follower 125, which follower also is provided with a semi-circular shoulder 128 that is spaced to the left of the bottom of a recess 129 in the follower 125, which recess receives the right-hand end of the spool valve 124. Adjacent right-hand end, the spool valve 124 is provided with an annular groove 130 for receiving the semi-circular shoulder 128 whereby the shoulder 128, annular groove 130, recess 129 and the right-hand end of the spool valve 124 cooperate with the diaphragm followers 125 and 126 to provide an operative connection between the spool valve 124 and the diaphragm 114.

The spool valve 124 is provided intermediate its ends with two, axially spaced-apart O-ring seals 131 and 132 disposed in corresponding annular recesses open to the peripheral surface of said spool valve; said rings having sealing and sliding contact with the wall of bore 118 to minimize leakage of fluid pressure from chamber 117 to the opposite end of bore 118 and to the hereinbeforementioned branch passageway 65b which opens at the surface of the bore 118 intermediate the ends thereof. Also opening at the surface of the bore 118 is one end of a passageway 133 in the filling piece 13, the opposite end of which opens within an annular valve seat 134 to a chamber 135. Contained in chamber 135 is a disc valve member 136 which cooperates with the annular valve seat 134. Interposed between the valve member 136 and a screw plug 137 closing the open end of chamber 135 is a spring 138 for resiliently seating the valve member 136 on the seat 134 to normally close communication between the chamber 135 and the passageway 133.

The hereinbefore-mentioned second branch passageway 63b formed in the filling piece 13 leads to the chamber 116 at one side of the diaphragm 114. A third branch passageway 63c in the filling piece 13 connects the second branch passageway 63b to chamber 135.

The hereinbefore-mentioned branch passageway 61b leading to chamber 119 in the filling piece 13 is connected to the passageway 61 that is constantly connected via pipe 70 to the emergency reservoir 3 so that fluid under pressure at emergency reservoir pressure is always present in the chamber 119.

OPERATION

Initial charging

To initially charge the brake equipment, fluid under pressure is supplied to the brake pipe 1 in the usual well-known manner, and with a cut-out valve 139, which constitutes the cut-out valve of the combined cut-out cock and centrifugal dirt collector 6, in open position, as shown in FIG. 1A of the drawings, fluid thus supplied to the brake pipe 1 flows via branch pipe 7, cut-out valve 139, and passageway 103 to the strainer chamber 93 in the pipe bracket 8. Normally, fluid thus supplied to the chamber 93 flows through the strainer device 94 to the passageway within the inner perforated tubular retainer 96 and from thence flows through the choke 99 in the screw plug 95 to the chamber 33 at the left-hand side of the diaphragm 15 and through the passageway 100 to the emergency valve piston chamber 57, respectively.

With the diaphragm 15, graduating valve 17 and service slide valve 18 in the normal or outer release position, as shown in FIG. 1B of the drawings, fluid under pressure that is conveyed to the chamber 33 flows therefrom through the passageway 63 extending through the pipe bracket 8, filling pieces 13 and 14 and body 19 and the corresponding port in the slide valve seat 37, passageway 104, choke 106 and passageway 107 in the service slide valve 18, and the passageway 109 in the graduating valve 17 to chamber 34, and from thence through passageway and pipe 35 to the auxiliary reservoir 4. From the chamber 34 fluid under pressure also flows to the emergency reservoir 3 by way of the restricted passageway 110 in the service slide valve 18, the port 61 opening at the seat 37 of the service slide valve 18 and the corresponding passageway extending through the body 19, filling pieces 14 and 13, pipe bracket 8 and the pipe 70 so that both the auxiliary reservoir 4 and the emergency reservoir 3 are charged with fluid up to brake pipe pressure. The restricted port 110 retards the rate of flow of fluid to the emergency reservoir 3, so that more fluid will flow toward the back end of the train than would be the case if the flow of fluid to this reservoir were at a fast rate. Further, fluid under pressure flows from the chamber 33 to the passageway 63 and thence through the branch passageway 63a to the volume chamber 75, but flow therefrom through the choke 76 to the heretofore used and now removed release insuring valve device is prevented by the gasket 78.

If, for any reason, the pressure of fluid increases more rapidly in the chamber 33 than it does in the chamber 34, the diaphragm 15 will be deflected in the direction of the right hand against the yielding resistance of the spring 42. As the diaphragm 15 is thus deflected, it shifts the service slide valve 18 to its inner release position, in which communication from the port and corresponding passageway 63 in the body 19 to the passageway 104 in the service slide valve 18 is closed and a communication from the port and corresponding passageway 63 to the passageway 107 in the service slide valve 18 is established via the choke 108, which choke 108, as hereinbefore explained, is smaller than the choke 106. Thus the chamber 34 is charged via choke 108 and passageways 107 and 109 in the service slide valve 18 and graduating valve 17 respectively at a slower rate. Accordingly, it is apparent that the new service slide valve 18 and the new graduating valve 17 provide for the retarded recharge feature of the well-known AB valve device used on most railway freight cars now in use in the United States.

When, with the parts of the modified service valve device 11 in their inner release or retarded recharge position, the pressures of fluid in the chambers 33 and 34 are substantially equal, the spring 42 acts through the medium of the movable stop member 41 to deflect the diaphragm 15 in the direction of the left hand and to shift the service slide valve 18 and graduating valve 17 to their outer or normal release position.

With the emergency piston 56 in its release position, as shown in FIG. 1A of the drawings, fluid under pressure supplied, as before described, to the chamber 57 flows therefrom through the choke 60a and passageway 60 respectively to the quick action chamber 58 and to the chamber 59 at the left-hand side of the piston 56. The fluid under pressure thus supplied to the emergency valve device 12 is effective to maintain the emergency valve device 12 in its normal release position in the manner fully described in the hereinbefore-mentioned patent to Farmer.

In either the outer or inner release position of the service slide valve 18 of the service valve device 11, the brake cylinder device 2 is open to atmosphere through the emergency valve device 12, as explained in the hereinbefore-mentioned patent to Farmer, to the passageway 67 extending through the pipe bracket 8, filling pieces 13 and 14, and the body 19, the corresponding port in the slide valve seat 37, a cavity 140 in the service slide valve 18, the port 66 in the slide valve seat 37 and corresponding passageway extending through the body 19, filling pieces 14 and 13 and the pipe bracket 8, the flange fitting 84, the pipe 85, and finally through the pressure retaining valve device 86 which is normally carried in the cut-out position, and in the following description of operation, will be assumed to be in this position unless otherwise specified.

With the service valve device 11 in either the outer normal release position or the inner release or retarded recharge position, the chamber 87 below the diaphragm 88 of the quick service limiting valve device 73 is open to the atmosphere through branch passageway 67a extending through the body 19, filling pieces 13 and 14, and the pipe bracket 8 to the passageway 67 which is open to atmosphere, as hereinbefore explained. With the diaphragm chamber 87 thus open to atmosphere, a spring 141, interposed between a diaphragm follower 142 disposed on the upper side of the diaphragm 88 and the upper end of a counterbore 143 formed in the casing 19, acting through the medium of the diaphragm 88 holds a disc valve 144 unseated, so that the quick service passageway 62 leading from the corresponding port in the service valve seat 37 of the service slide valve 18 is at substantially atmospheric pressure.

The fluid under pressure supplied from the brake pipe 1 to the passageway 63, as hereinbefore described, flows from this passageway via the branch passageway 63b in the filling piece 13 to the chamber 116 (FIG. 3) at the right-hand side of the diaphragm 114 of the valve device 72. Likewise, the third branch passageway 63c conveys fluid under pressure at brake pipe pressure from the second branch passageway 63b to the chamber 135.

Fluid under pressure that is conveyed from the chamber 34 via the port and passageway 35 to the auxiliary reservoir 4 is also conveyed from the passageway 35 via the branch passageway 35b in the filling piece 13 to the chamber 117 at the left-hand side of the diaphragm 114.

Furthermore, the fluid under pressure that is conveyed from the chamber 34 via the port and passageway 61 to the emergency reservoir 3 is also conveyed from the passageway 61 via the branch passageway 61b in the filling piece 13 to the chamber 119 in the valve device 72.

Consequently, when the auxiliary reservoir 4 and the emergency reservoir 3 on each freight car are fully charged to the normal brake pipe pressure carried in the brake pipe extending from end to end of the train, the pressures present in the chambers 116, 117 and 119 in the valve device 72 are all equal and are the same as the pressure in the brake pipe.

When the pressures in the chambers 116, 117 and 119 are thus all equal, the spring 123 is effective to bias the valve members 112 and 113 and the diaphragm 114 to the position in which they are shown in FIG. 3, in which position the valve member 113 rests upon the annular valve seat 120 to close communication between the chamber 119 and the port and corresponding passageway 133 via the bore 118.

*Service application*

A service application of the brakes is initiated by effecting a gradual reduction in brake pipe pressure in the usual well-known manner. Since, as before described, the brake pipe 1 is in communication with the chambers 33 and 57, the pressure of fluid in these chambers gradually reduces with the brake pipe pressure.

Upon a predetermined, but light reduction in pressure in the chamber 33, the pressure of fluid in the chamber 34 causes the diaphragm 15 to deflect outwardly in a direction toward the left hand, and through the medium of the stem 28, shifts the graduating valve 17 relative to the service slide valve 18. As the graduating valve 17 is thus shifted, it laps the corresponding port of the passageway 110 opening at the upper surface of the service slide valve 18, thus closing the communication between the valve chamber 34 and the emergency reservoir 3. At substantially the same time as the passageway 110 is closed by the graduating valve 17, the first passageway 109 in the graduating valve 17 is moved out of registry with the second passageway 107 in the service slide valve 18, so as to prevent back flow of fluid under pressure from the chamber 33. After the passageway 107 is closed, the continued deflection of diaphragm 15 causes the back end of the graduating valve 17 to open a port at one end of a service passageway 145 is in the service slide valve 18 and opening at the upper surface of slide valve 18, following which the plunger 53, mounted in the back end of the stem 28, contacts the back or end surface 45 of the service slide valve 18. The further outward movement of the graduating valve 17 by the diaphragm 15 and relative to the service slide valve 18 is now resisted by the spring 54 acting through the stem 28. Now when a predetermined light reduction in brake pipe pressure has been effected, say for instance about 1.2 pounds, a sufficient fluid pressure differential is created on the diaphragm 15 so that the diaphragm will be caused to deflect outwardly or in the direction of the left hand, overcoming the resistance offered by the spring 54, and shifting the graduating valve 17 to initial quick service position. The diaphragm 15 is very sensitive to pressure differentials and, therefore, quickly responds to a light but predetermined brake pipe reduction to move the graduating valve 17 relative to the service slide valve 18 to close the restricted passageway 110 and to open the corresponding port opening at the upper surface of the service slide valve 18 from the service passageway 145, and then to move the graduating valve 17 to quick service position.

In the initial quick service position of the graduating valve 17, a cavity 146 in said valve connects passageway 104 in the service slide valve 18 to a passageway 147 also in the service slide valve and having a choke 148 therein, which choke in actual practice has a diameter of .063 inch. At the seat 37 of the service slide valve 18, the passageway 104, as before described, is connected to the passageway 63, which is at all times open to the brake pipe 1 through chamber 33, strainer device 94 and the passageway 103 in the pipe bracket 8. The passageway 147 is open through a cavity 149 formed in the lower or seating face of service slide valve 18 to the port and passageway 64 leading to a quick service volume chamber 79 in the body 19, which chamber 79 is constantly open to the atmosphere through the passageway 80, the choke plug 81 interposed in the latter passageway, and the insect excluder 82 in back cover 38. With the passageways 63 and 64 thus connected to each other, fluid under pressure is permitted to flow from the brake pipe 1 to the quick service volume chamber 79 and from thence is permitted to flow to the atmosphere by way of passageway 80, choke plug 81 and insect excluder 82.

The initial local quick service flow of fluid from the brake pipe to the quick service volume chamber 79 is at a fast rate until the brake pipe pressure substantially equalizes into the volume chamber 79 and then continues at a slower rate as governed by the choke plug 81. The initial flow of fluid to the volume chamber 79 produces a sudden limited quick service reduction in pressure in the brake pipe 1 for initially hastening the operation of the brake controlling valve device 5 on the next car in a train. The valve device 5 on said next car then operates in a similar manner, and in this way a quick serial response to the brake pipe reduction is transmitted from one car to the next throughout the length of the train.

After this sudden limited reduction in brake pipe pressure has been effected by the flow of fluid to the quick service volume chamber 79, the quick service reduction continues at a slower rate through the choke plug 81. This continued reduction is for the purpose of insuring movement of the local service slide valve parts to service position. When graduating valve 17 moves to the initial quick service position, the lug 44 on the stem 28 contacts the back surface 45 on the service slide valve 18, so that upon further deflection of the diaphragm 15 in the direction of the left hand toward service position, the service slide valve 18 will be shifted in the same direction.

As the service slide valve 18 is shifted by the diaphragm 15 in the direction of the left hand from its normal release position in which it is shown in FIG. 1B, the passageway 104 in the service slide valve 18 is moved out of registry with the port and corresponding passageway 63 in the body 19 and a passageway 150, extending through the service slide valve 18 in parallel spaced-apart relation to the passageway 104 and disposed on the right-hand side thereof, is moved into registry with the port and passageway 63. Intermediate its ends the passageway 150 in the service slide valve 18 is provided with a choke 151 which in actual practice has a diameter of .0625 inch. Therefore, as the service slide valve 18 is moved by deflection of the diaphragm 15 in the direction of the left hand from its normal outer release position, in which it is shown in FIG. 1B, in which position the passageway 104 is in registry with the port and corresponding passageway 63, to the position in which the passageway 150 is in registry with the port and passageway 63, the initial quick service venting of fluid from the brake pipe 1 will continue for a short period of time via the chokes 151 and 148 in series, the cavity 146 in the graduating valve 17 and the cavity 149 in the lower seating face of the service slide valve 18, which cavities 146 and 149 are of sufficient length to insure that communication between the port and corresponding passageway 63 and the port and corresponding passageway 64 is continuous during this movement of the service slide valve 18. As the service slide valve 18 continues to move, it laps the port and passageway 63, closing off the further quick service flow of fluid from the brake pipe 1 to the atmosphere by way of the quick service volume 79. At substantially the same time as the port and passageway 63 is lapped, the port opening from the service passageway 145 at the lower face of the service slide valve 18 is cracked open to the port and passageway 67, it being remembered that the port opening from the service passageway 145 at the upper face of the service slide valve 18 has been previously uncovered by the graduating valve 17. Therefore, fluid under pressure will now start to flow from the chamber 34 and the connected auxiliary reservoir 4 to the brake cylinder 2 by way of the service passageway 145 in service slide valve 18, port 67 in seat 37 and the corresponding passageway 67 extending through body 19, filling pieces 14 and 13, pipe bracket 8, emergency valve device 12 in the manner described in detail in the herein before-mentioned patent to Farmer, and a passageway and pipe 152. Immediately following this, the port and corresponding passageway 63 is cracked open to a cavity 153 in the lower face of the service slide valve 18. Opening into the cavity 153 is one end of a passageway 154 formed in the service slide valve 18, the opposite end of which has a corresponding port opening at the lower face of the service slide valve 18 at a location such that when the cavity 153 moves into registry with the port and corresponding passageway 63 in the body 19 this corresponding port at the opposite end of the passageway 154 will be in registry with the port and corresponding passageway 62 in the body 19. The passageway 154 has intermediate its ends a choke 155 which in actual practice has a diameter of .047 inch and a branch passageway 154a that opens at the upper surface of the service slide valve 18. This branch passageway 154a has therein a choke 154b which in actual practice has a diameter of .014 inch. Consequently, when the cavity 153 in the service slide valve 18 is moved into registry with the port and corresponding passageway 63 in the body 19, fluid under pressure flows at a slow rate controlled by the size of the choke 155 from the brake pipe 1 to the brake cylinder 2 by way of passageway and corresponding port 63, cavity 153, choke 155 in passageway 154, port and corresponding passageway 62 in the body 19, choke 74 in the passageway 62, past a flat disc check valve 156 in the quick service limiting valve device 73, a valve chamber 157 in valve device 73, past the open valve 144 of this valve device, the chamber 87, passageways 67a and 67, the emergency valve device 12 in the manner explained in the above-mentioned Farmer patent, and passage and pipe 152.

Fluid under pressure supplied from the brake pipe 1 to the passageway 154 after passing through the choke 155 also flows through the branch passageway 154a, the choke 154b therein and a passageway 154c that extends through the graduating valve 17 to the chamber 34, when the graduating valve 17 is subsequently moved to service lap position, which chamber 34 is connected to the auxiliary reservoir 4 via passageway and corresponding pipe 35. The fluid under pressure thus supplied to the chamber 34 and auxiliary reservoir 4 at at a rate controlled by the choke 154b maintains the pressure in the auxiliary reservoir 4 against leakage so long as the rate of leakage from the auxiliary reservoir 4 does not exceed the capacity of the choke 154b. This constitutes an auxiliary reservoir pressure maintaining feature that is effective while the brakes are applied to prevent an undesired release of the brakes due to auxiliary reservoir leakage.

The capacity of the service passageway 145 in the service slide valve 18 is such that, when a communication is established from the slide valve chamber 34 to the brake cylinder port and corresponding passageway 67, and the brake pipe passageway and port 63 is in communication with the port and corresponding passageway 62 in the body 19 so that fluid under pressure may also flow from the brake pipe 1 to the brake cylinder 2 via the quick service limiting valve 73, as just explained, the flow from the chamber 34 and the auxiliary reservoir 4 to the brake cylinder device 2 will be at such a rate as to reduce the pressure in the chamber 34 and the auxiliary reservoir 4 fast enough to prevent further deflection of the diaphragm 15 in the direction of the left hand. Consequently, the service slide valve 18 is thus stopped in its service position, in which position the port and corresponding passageway 63 in body 19 is connected via passageway 154 and choke 155 in the service slide valve 18 to the port and corresponding passageway 62, also in body 19, so that fluid under pressure will flow from the brake pipe 1 to the brake cylinder 2 via the quick service limiting valve device 73.

Now when a predetermined brake cylinder pressure has been developed, say for instance nine pounds per square inch, fluid at brake cylinder pressure in diaphragm chamber 87 of the quick service limiting valve device 73 causes the diaphragm 88 to deflect upward, as viewed in FIG. 1B, against the opposing pressure of the spring 141 which permits a spring 158 disposed in the chamber 157 and interposed between the check valves 144 and 156 to seat the check valve 144. With the check 144 thus seated, the final quick service flow of fluid from the brake pipe 1 to the brake cylinder device 2 is cut off.

It will be apparent from the foregoing description that the AB valve, when modified and upgraded to replace the ring type service piston with the diaphragm 15 and the formerly used graduating valve and service slide valve with the new graduating valve 17 and new service slide valve 18, functions as heretofore to effect a local quick service reduction in brake pipe pressure in three stages after a light but predetermined reduction in brake pipe pressure has been effected through the medium of the usual brake valve device on the locomotive.

Upon a service reduction in pressure in the emergency piston chamber 57, the emergency valve device 12 operates in the same manner as described in detail in the hereinbefore-mentioned Farmer patent, to reduce the pressure in the quick action chamber 58 in the pipe bracket 8 at the same rate and to the same degree as brake pipe pressure is reduced.

*Service lap*

In order to limit the degree of brake application, the brake pipe pressure is only reduced an amount sufficient to effect the desired service application. Then, when the auxiliary reservoir pressure in the chamber 34 is reduced, by flow of fluid through the service ports and corresponding passageway 145 in the service slide valve 18 and the port and corresponding passageway 67 in the body 19, filling pieces 14 and 13 and pipe bracket 8, the emergency valve device 12, and the passageway and corresponding pipe 152 to the brake cylinder device 2, an amount substantially equal to the degree of brake pipe reduction in the chamber 33, the diaphragm 15, stem 28 and graduating valve 17 are deflected and moved respectively in the direction of the right hand from service position to service lap position, in which they are brought to a stop by a shoulder 159 on the stem 28 moving into contact with the forward or left-hand end of the service slide valve 18. This deflection of the diaphragm 15 and movement of the stem 28 and graduating valve 17 is initiated by the action of the compressed spring 54 which cooperates with the stem 28 and service slide valve 18 to begin the deflection of the diaphragm 15 in the direction of the right hand and then to continue this deflection and to move the graduating valve 17 toward service lap position, but just before the port opening at the upper side of the service slide valve 18 from the service passageway 145 therein is fully lapped by the graduating valve 17, the end of the plunger 53 contacts the stop shoulder 52 on the stem 28 so that the spring 54 will no longer act to deflect the diaphragm 15 and move the stem 28 and graduating valve 17 toward lap position. Now, a slight pressure differential on the diaphragm 15, which will be caused by the pressure of fluid in the chamber 34 reducing slightly below the brake pipe pressure in the chamber 33 by flow to the brake cylinder device 2, deflects the diaphragm 15 in the direction of the right hand and thereby moves, through the intermediary of the stem 28, the graduating valve 17 to lap position, in which the graduating valve 17 laps the port opening at the upper side of the service slide valve 18 from the service passageway 145 therein and thus closes off the further flow of fluid under pressure from the auxiliary reservoir 4 to the brake cylinder 2.

If, after a limited application of the brakes has been effected, it is desired to increase the brake cylinder pressure, a further reduction in brake pipe pressure is effected through the medium of the brake valve device on the locomotive which causes the diaphragm 15 to be deflected in the direction of the left hand to shift the graduating valve 17 from service lap position to service position to uncover the port opening at the upper side of the service slide valve 18 from the service passageway 145 so that fluid under pressure again flows from the auxiliary reservoir 4 to the brake cylinder device 2. It will be noted that the deflection of the diaphragm 15 and movement of the stem 28 and graduating valve 17 from service lap position to the position for uncovering the port opening at the upper side of the service slide valve 18 from the service passageway 145 therein is unopposed by the spring 54. By reason of this, the graduating valve 17 will promptly move to reapplication position upon a very slight reduction in brake pipe pressure. Fluid under pressure will again flow from the auxiliary reservoir 4 to the brake cylinder device 2 until the pressure in chamber 34 is reduced enough to cause the graduating valve 17 to return to lap position in the manner hereinbefore described. Thus it is possible to obtain the service braking pressure up to full service (or equalization between auxiliary reservoir and brake cylinder) in a series of small increments or stages.

During a service application of the brakes, the valve device 72 is inoperative for the reason that brake pipe pressure is reduced in chamber 116 prior to any reduction in auxiliary reservoir pressure in chamber 117 and, subsequent to the reduction in brake pipe pressure in chamber 116, the auxiliary reservoir pressure in chamber 117 is reduced to the existing brake pipe pressure present in the chamber 116. Consequently, no pressure differential is established on the opposite sides of the diaphragm 114 to effect leftward deflection of this diaphragm to unseat the valve member 113 from the annular valve seat 120.

*Release of the brakes following a service application*

To effect a release of the brakes after an application, fluid under pressure is supplied to the brake pipe 1 from the usual brake valve (not shown) on the locomotive and flows from the brake pipe 1 to the chambers 33 and 57 in the upgraded AB valve device 5 in the same manner as has before been described in connection with the initial charging of the equipment.

The rapid increase in brake pipe pressure at the front end of the train creates a pressure differential by reason of the choke 155 in the service slide valve 18 and also because limiting valve 73 is closed, on the diaphragm 15 of the AB valves on the cars at the front end, which differential causes the diaphragm 15 on these cars to deflect in the direction of the right hand to promptly move the graduating valve 17 and service slide valve 18 to the outer or retarded recharge position, in which position the collar 44 on the stem 28 contacts the movable stop member 41. In normal or outer release position, fluid under pressure is permitted to flow from chamber 33 to the chamber 34 through the choke 106 but the flow capacity of this choke is not great enough to permit fluid to flow therethrough at as fast a rate as fluid is supplied to the chamber 33 on cars at the head end of the train. As a result, a sufficient pressure differential is created on the diaphragm 15 to deflect this diaphragm to move the stem 28, graduating valve 17 and service slide valve 18 to an inner release or retarded recharge position against the opposing force of the spring 42 in which port and corresponding passage 63 is open via choke 108 to passageway 107 in service slide valve 18.

In the inner release or retarded recharge position of graduating valve 17 and service slide valve 18, fluid under pressure is supplied at a restricted rate from the chamber 33 to the chamber 34 and connected auxiliary reservoir 4 through passageway and corresponding port 63, choke 108 which has a smaller diameter than the choke 106, as hereinbefore mentioned, passageway 107 in service slide valve 18, and passageway 109 in graduating valve 17. Fluid under pressure is also supplied to the chamber 34 and auxiliary reservoir 4 from the fully charged emergency reservoir 3 by way of the pipe 70, flange fitting 69, passageway and corresponding port 61, and restricted passageway 110 in the service slide valve 18, which restricted passageway 110 has been uncovered by the graduating valve 17. Due to the restricting of the flow of fluid from the brake pipe 1 via the small choke 108 to the chamber 34 and auxiliary reservoir 4 and to the supplying of fluid under pressure from the emergency reservoir 3 to the auxiliary reservoir 4, the amount of fluid taken from the brake pipe 1 will not be great and due to this more fluid will flow toward the back end of the train, thus hastening the charging of the brake pipe on the cars toward and at the back end of the train.

The restricted passageway 110 in the service slide valve 18 limits the rate at which fluid flows from the emergency reservoir 3 to the auxiliary reservoir 4 to such an extent that the auxiliary reservoir pressure in the chamber 34 will be less than the brake pipe pressure in chamber 33 and thus prevents unintentional movement of the graduating valve 17 and service slide valve 18 to quick service or service position in releasing the brakes.

When the pressures of fluid in the chambers 33 and 34 and acting on opposite sides of the diaphragm 15 become substantially equal, the spring 42 acts to promptly deflect the diaphragm 15 in the direction of the left hand and shift the stem 28, graduating valve 17 and service slide valve 18 from their inner or retarded recharge position in which the choke 108 is in registry with the port 63 opening at the surface of the slide valve seat 37 to their outer or normal release position in which the corresponding port opening at the lower side of the service slide valve 18 from the passageway 104 therein is in registry with the port 63, in which normal release position the graduating valve 17 and service slide valve 18 are shown in FIG. 1B of the drawings.

With the graduating valve 17 and service slide valve 18 in either the outer normal release position or the inner retarded recharge position, the cavity 140 in the lower side of the service slide valve 18 connects the ports 66 and 67 and their corresponding passageways, so that fluid under pressure is released from the brake cylinder device 2 to atmosphere by way of pipe and corresponding passageway 152, the emergency valve device 12, the passageway 67 extending through the pipe bracket 8, filling pieces 13 and 14 and body 19 and the corresponding port in the slide valve seat 37, the cavity 140 and the corresponding port in the slide valve seat 37, port and corresponding passageway 66 extending through the body 19, filling pieces 14 and 13, and pipe bracket 8, flange fitting 84, pipe 85 and pressure retaining device 86.

When effecting a release of the brakes, the emergency valve device 12 and the quick service limiting valve device 73 operate in substantially the same manner, as described in detail in the hereinbefore-mentioned Farmer patent. Hence, a detailed description of their operation during a release of the brakes is not deemed necessary herein.

When the graduating valve 17 and service slide valve 18 are returned to their outer or normal release position, fluid under pressure may continue to flow, through the restricted passageway 110 in the service slide valve 18, from the emergency reservoir 3 to the chamber 34, but after equalization of pressures in both reservoirs, fluid under pressure conveyed to chamber 34 from chamber 33, via passageway and corresponding port 63, passageway 104 and choke 106 therein, passageway 107 and passageway 109, flows to both reservoirs, thus finally charging both reservoirs to the pressure carried in brake pipe 1.

From the foregoing description of the initial charging of the equipment, a service brake application, and a release of brakes following a service brake application, it should be apparent that the emergency portion 12 and the service portion 11 using a new graduating valve 17, a new slide valve 18 and a diaphragm 15 in place of a ring type service piston operate in substantially the same manner as the corresponding emergency and service portions of the existing form of the well-known AB valve device. However, the combination of the valve device 72 with the emergency portion 12 and the service portion 11 provides for a much quicker release of the brakes on a train of say one hundred and fifty freight cars than has heretofore been possible when the cars are all provided with the existing form of the well-known AB valve.

When the pressure in the brake pipe 1 is increased to effect a release of the brakes on a train subsequent to a service application of the brakes, this increase in brake pipe pressure is effective to increase the pressure in chamber 116 of the valve device 72 above the auxiliary reservoir pressure present in the chamber 117 to establish a fluid pressure differential on the diaphragm 114 which separates the chambers 116 and 117. This fluid pressure differential thus established on the opposite sides of the diaphragm 114 is effective to deflect the diaphragm in the direction of the left hand, as viewed in FIG. 3 of the drawings, and shift the spool valve 124 in the same direction relative to the wall of the bore 118. The leftward movement of spool valve 124 in response to the increasing differential of pressure on opposite sides of diaphragm 114 causes the left-hand end of the spool valve to unseat valve member 113 from its seat 120 against the yielding force of the spring 123. With valve member 113 unseated, a fluid pressure communication is established by which fluid under pressure is supplied from the emergency reservoir 3 to the brake pipe 1, this communication extending from the emergency reservoir 3 by way of pipe 70, flange fitting 69, passageway 61 extending through the pipe bracket 8 and the filling piece 13, the second branch passageway 61b in the filling piece 13, chamber 119, past unseated valve member 113, to bore 118 and hence through the port and corresponding passageway 133 to the inner seated area of the disc valve member 136. When the pressure of fluid acting on the right-hand side of the disc valve member 136 and within the inner seated area thereof increases sufficiently to overcome the biasing force of the spring 138 acting on the left-hand side thereof, the disc valve member 136 will be unseated from its seat 134. With the disc valve member 136 unseated, a fluid pressure communication is established through which fluid under pressure supplied to the passageway 133 from the emergency reservoir 3, as described above, is conveyed to the chamber 135 and thence through the third branch passageway 63c and second branch passageway 63b in the filling piece 13, passageway 63 in the filling piece 13 and pipe bracket 8, chamber 33, choke 99 in screw plug 95, strainer device 94, chamber 93, passageway 103 in pipe bracket 8 and extension 89, open cut-out valve 139, and branch pipe 7 to the brake pipe 1. Thus, upon increasing the pressure in the brake pipe 1 to initiate a release of the brakes subsequent to a service brake application, a slight increase in brake pipe pressure above auxiliary reservoir pressure is effective to unseat valve 113 to establish a communication between the fully charged emergency reservoir 3 and the brake pipe 1 so that fluid under pressure flows from the emergency reservoir 3 to the brake pipe 1 until equalization of pressures therein occurs thus hastening a release of the brakes since all of the fluid under pressure supplied to the brake pipe for effecting the release of the brakes does not have to be conveyed from the locomotive back through the brake pipe extending from car to car through the train, as has heretofore been the case when effecting a release of the brakes on a train of freight cars, each of which is provided with the well-known AB freight brake equipment.

It may be noted that the fluid under pressure supplied from the emergency reservoir 3 to the chamber 33 when the valve member 136 is unseated must flow through the choke 99 in the screw plug 95 in order to flow to the brake pipe 1. The choke 99 acts to restrict the flow from the chamber 33 and thereby effects a quick build-up of pressure in the chamber 33 and on the left-hand side of the diaphragm 15. This increase in pressure on the left-hand side of the diaphragm 15, due to the restriction offered by the choke 99, aids in quickly establishing a sufficient differential of pressure on the diaphragm 15 to deflect the diaphragm 15 in the direction of the right hand to, through the intermediary of the stem 28, shift the graduating valve 17 and the service slide valve 18 from service lap position to release position in which fluid under pressure in the brake cylinder device 2 is vented to atmosphere to release the brakes on the corresponding car.

As has been hereinbefore mentioned, the valve device 72 enables the elimination or omission of the present release insuring valve found in the well-known AB valve device. The valve device 72 operates in the following manner to perform the function of the release insuring valve which it replaces.

When the O-ring seal 131 is carried by the spool valve 124 is moved in the direction of the left hand, as viewed in FIG. 3, past the corresponding port opening at the surface of the bore 118 from the passageway 65b in filling piece 13 in response to movement of the spool valve 124 by deflection of the diaphragm 114, a fluid pressure communication is established from the chamber 117 to the port and corresponding passageway 65b via the bore 118. Since the chamber 117 is connected to the chamber 34 by way of the second branch passageway 35b in the filling piece 13 and the passageway 35 in the filling pieces 13 and 14 and the body 19, and is connected to the auxiliary reservoir 4 by way of the second branch passageway 35b and the passageway and corresponding pipe 35, fluid under pressure will flow from the chamber 34 and the auxiliary reservoir 4 via chamber 117 and bore 118 to the second branch passageway 65b which is connected to the passageway 65 extending through the filling pieces 13 and 14 and the body 19. As shown in FIG. 4, the bottom face of the service slide valve 18 is provided with the cavity 140 which, when the service slide valve 18 and graduating valve 17 are in their service lap position in which position they are shown in FIG. 4, establishes a communication between the port and corresponding passageway 65 and the port and corresponding passageway 66. The passageway 66 extends through the body 19, filling pieces 14 and 13, and the pipe bracket 8 and is open to atmosphere via flange fitting 84, pipe 85 and pressure retaining valve device 86. Consequently, when the spool valve 124 is moved in the direction of the left hand, as viewed in FIG. 3, far enough to establish a communication between the chamber 117 and the port and corresponding second branch passageway 65b, fluid under pressure will be vented from auxiliary reservoir 4 and the chamber 34 to atmosphere by way of pipe and corresponding passageway 35 extending through body 19 and filling pieces 14 and 13, second branch passageway 35b in the filling piece 13, chamber 117, bore 118, the port and corresponding second branch passageway 65b, passageway 65 extending through the filling pieces 13 and 14 and the body 19 and the corresponding port opening at the surface of the slide valve seat 37, the cavity 140 in the bottom face of the service slide valve 18, the port and corresponding passageway 66 extending through the body 19, filling pieces 14 and 13 and the pipe bracket 8, flange fitting 84, pipe 85 and pressure retaining valve device 86. Fluid under pressure will now be vented from the chamber 34 and the auxiliary reservoir 4 until the increasing pressure in the chamber 33 and the decreasing pressure in the chamber 34 establishes a sufficient differential of pressure on the diaphragm 15 to deflect it in the direction of the right hand, as viewed in FIG. 1B, and through the intermediary of the stem 28, move the graduating valve 17 and the service slide valve 18 from their service lap position in which they are shown in FIG. 4 to their normal release position in which they are shown in FIG. 1B.

From the above, it should be apparent that the valve device 72 operates, when releasing the brakes after a service application, in cooperation with the choke 99 in the screw plug 95 and the service slide valve 18 when in its service lap position to respectively, simultaneously increase the pressure in the chamber 33 and decrease the pressure in the chamber 34 to quickly establish a sufficient differential of pressure on the diaphragm 15 to deflect it in the direction of the right hand to shift the graduating valve 17 and service slide valve 18 from their service lap position to their normal or outer release position, in which normal release position fluid under pressure is released from the brake cylinder device 2 to atmosphere and the auxiliary reservoir 4 and the emergency reservoir 3 are charged in the manner hereinbefore described in connection with initial charging of the equipment from the brake pipe 1 to the pressure normally carried in the brake pipe.

Furthermore, the valve device 72 operates in cooperation with the service portion 11, the emergency portion 12 and the pipe bracket 8 of the brake control valve device 5, when releasing the brakes subsequent to a service application of brakes, to effect the supply of fluid under pressure from the emergency reservoir 3 to the brake pipe 1 until equalization of pressure therebetween is accomplished thereby hastening the propagation of a pressure build-up in the brake pipe and thus a release of the brakes on the train.

*Emergency application*

To effect an emergency application of the brakes, fluid under pressure is suddenly vented at a rapid rate from the brake pipe 1 and from the connected chambers 33 and 57, respectively, and upon this reduction the service valve device 11 operates, in the same manner as in effecting a service application of the brakes, to supply fluid under pressure from the auxiliary reservoir 4 to the brake cylinder device 2.

At substantially the same time as the service valve device 11 operates upon an emergency reduction in brake pipe pressure, fluid under pressure in the chamber 59, acting on the inner or left-hand face of the emergency piston 56, causes the piston 56 to be moved in the direction of the right hand to its emergency position. Movement of the emergency piston 56 to its emergency position effects operation of the emergency valve device 12 in the same manner, as described in detail in the hereinbefore-mentioned Farmer patent to effect the supply of fluid under pressure from the emergency reservoir 3 to the brake cylinder device 2 so that when an emergency application of the brakes is effected, fluid under pressure is supplied from both the auxiliary reservoir 4 and the emergency reservoir 3 to the brake cylinder device 2 to give the same high degree of brake cylinder pressure (approximately sixty pounds per square inch) as is now obtained with the existing form of well-known AB valve device.

*Release of the brakes after an emergency application*

To effect a release of the brakes after an emergency application, fluid under pressure is supplied from the brake valve on the locomotive to the brake pipe 1 from whence it flows to the chambers 33 and 57, respectively. Fluid in the chamber 34 of the service valve device 11 is at reduced auxiliary reservoir pressure and fluid in the chamber 59 of the emergency valve device 12 is at atmospheric pressure, so that upon a slight increase in brake pipe pressure the emergency piston 56 will move to either its outer or its inner release position, as explained in detail in the hereinbefore-mentioned Farmer patent, before the diaphragm 15 in the service valve device 11 is caused to deflect in the direction of the right hand to move the graduating valve 17 and service slide valve 18 to their release position. The rate of flow of fluid through the choke 60a, forming the communication from the chamber 57 to the passageway 60, is inadequate to offset the rate at which the pressure of fluid in the chamber 57 is increased. Consequently, the emergency valve device 12 operates, in the usual manner, to trap or bottle up the fluid under pressure in the emergency reservoir 3 at a pressure of approximately sixty pounds per square inch, and back-dump fluid under pressure from the auxiliary reservoir 4 and the brake cylinder device 2, connected together through the service valve device 11 which is still in service application position, to the brake pipe 1 to suddenly increase the brake pipe pressure to about forty pounds per square inch due to equalization of the pressure in the auxiliary reservoir 4 and the brake cylinder device 2 into the brake pipe 1.

As a result of equalization of the auxiliary reservoir pressure and the brake cylinder pressure into the brake pipe, the pressure in the chambers 116 and 117 of the valve device 72 and in the chambers 33 and 34 of the service valve device 11 will all be at the equalization pressure of about forty pounds per square inch following this equalization. After equalization, charging of the brake pipe 1 from the brake valve on the locomotive is continued in the usual manner. This continued increase in brake pipe pressure increases the pressure in the chamber 116 of the valve device 72 above the auxiliary reservoir pressure present in the chamber 117 and establishes a differential of pressure on the diaphragm 114 which effects operation of the valve device 72 in the manner hereinbefore described in connection with releasing the brakes subsequent to a service brake application to establish a communication between the emergency reservoir 3, wherein the pressure is approximately sixty pounds per square inch, as above mentioned, and the chamber 33 wherein the pressure is only slightly above forty pounds per square inch due to the slight increase in brake pipe pressure effected subsequent to equalization of the auxiliary reservoir pressure and brake cylinder pressure into the brake pipe at about forty pounds per square inch. Fluid under pressure will now flow from the emergency reservoir 3 to the chamber 33 and thence to the brake pipe 1 until equalization occurs between emergency reservoir 3 and the brake pipe 1.

The valve device 72 also operates at this time to reduce the pressure in the chamber 34 and auxiliary reservoir 4 in the manner hereinbefore explained in detail in connection with a service application of the brakes. Therefore, this reduction in pressure in the chamber 34 and a quick build-up of pressure in the chamber 33 due to the choke 99 in the screw plug 34 restricting the flow of fluid under pressure from the chamber 33 to the brake pipe 1 cooperate to quickly establish a sufficient differential of pressure on the diaphragm 15 to deflect it in the direction of the right hand, as viewed in FIG. 1B, to, through the intermediary of the stem 28, shift the graduating valve 17 and service slide valve 18 from their service position to their release position. When the graduating valve 17 and service slide valve 18 are returned to their release position, the fluid under pressure remaining in the brake cylinder 2 will be vented to atmosphere and the auxiliary reservoir 4 and emergency reservoir 3 fully charged from the brake pipe 1 in the manner hereinbefore described in connection with a release of the brakes subsequent to a service brake application.

Having now described the invention, what I claim as new and desire to secure by Letters Patent, is:

1. In a fluid pressure brake system of the type including a normally charged brake pipe, auxiliary reservoir and supplemental reservoir, and a brake cylinder device, a fluid pressure brake controlling valve device comprising:

(a) a service valve portion operative in response to reduction from the normally charged pressure in the brake pipe at a service rate to effect the supply of fluid under pressure from the auxiliary reservoir to the brake cylinder device to cause a service application of the brakes, and (b) an accelerated release mechanism, said mechanism including:

(i) a normally closed valve, and (ii) a movable abutment subject in opposing relation to the brake pipe pressure and the auxiliary reservoir pressure and operative, independently of said service valve portion, responsively to an increase of the brake pipe pressure incident to initiating a brake release following a service application of the brakes for opening said valve to establish communication between the supplemental reservoir and the brake pipe thereby to accelerate the build-up of pressure therein and thus to accelerate restoration of said service portion from its brake application position to its brake release position.

2. In a fluid pressure brake system of the type including a normally charged brake pipe, auxiliary reservoir and an emergency reservoir, and a brake cylinder device, a fluid pressure brake controlling valve device comprising:

(a) a service valve portion operative in response to reduction from the normally charged pressure in the brake pipe at a service rate to effect the supply of fluid under pressure from the auxiliary reservoir to the brake cylinder device to cause a service application of the brakes, (b) an emergency portion operative, concurrently with said service portion responsively to reduction from the normally charged pressure in the brake pipe at an emergency rate, to effect the supply of fluid under pressure from the emergency reservoir to the brake cylinder device concurrently with the supply of fluid under pressure from the auxiliary reservoir to the brake cylinder device under the control of the said service portion, to cause an emergency application of the brakes, and (c) an accelerated release mechanism, said mechanism including:

(i) a normally closed valve, and (ii) a movable abutment subject in opposing relation to the brake pipe pressure and the auxiliary reservoir pressure and operative, independently of said service valve portion, responsively to an increase of the brake pipe pressure incident to initiating a brake release following both a service application and an emergency application of the brakes for opening said valve to establish communication between the emergency reservoir and the brake pipe thereby to accelerate the build-up of pressure therein and thus to accelerate restoration of said service portion from its brake application position to its brake release position.

3. A fluid pressure brake controlling valve device as claimed in claim 1, further characterized in that said accelerated release mechanism further comprises a second valve operated by said movable abutment upon an increase in brake pipe pressure incident to initiation of a brake release following a brake application to establish a connection via which to effect reduction of auxiliary reservoir pressure relative to brake pipe pressure thereby to insure movement of the brake controlling valve device to brake releasing position.

4. In a fluid pressure brake equipment, the combination with a brake pipe, an auxiliary reservoir, a supplemental reservoir, and a brake cylinder device, of a fluid pressure brake controlling valve device comprising:

(a) a service valve portion operative in response to reduction from the normally charged pressure in the brake pipe at a service rate to effect the supply of fluid under pressure from the auxiliary reservoir to the brake cylinder device to cause a service application of the brakes, and (b) an accelerated release mechanism, said mechanism including:

(i) a normally closed valve, and (ii) a movable abutment subject in opposing relation to the brake pipe pressure and the auxiliary reservoir pressure operative independently of said service valve portion responsively to an increase of the brake pipe pressure incident to initiating a brake release following a service application of the brakes for opening said valve to establish communication between the supplemental reservoir and the brake pipe thereby to accelerate the build-up of pressure therein and thus to accelerate restoration of said service portion from its brake application position to its brake release position.

5. In a fluid pressure brake equipment, the combination with a brake pipe, an auxiliary reservoir, an emergency reservoir, and a brake cylinder device, of a fluid pressure brake controlling valve device comprising:

(a) a service valve portion operative in response to reduction from the normally charged pressure in the brake pipe at a service rate to effect the supply of fluid under pressure from the auxiliary reservoir to the brake cylinder device to cause a service application of the brakes, (b) an emergency portion operative, concurrently with said service portion responsively to reduction from the normally charged pressure in the brake pipe at an emergency rate, to effect the supply of fluid under pressure from the emergency reservoir to the brake cylinder device concurrently with the supply of fluid under pressure from the auxiliary reservoir to the brake cylinder device under the control of the said service portion, to cause an emergency application of the brakes, and (c) an accelerated release mechanism, said mechanism including:

(i) a normally closed valve, and (ii) a movable abutment subject in opposing relation to the brake pipe pressure and the auxiliary reservoir pressure and operative, independently of said service valve portion, responsively to an increase of the brake pipe pressure incident to initiating a brake release following both a service application and an emergency application of the brakes for opening said valve to establish communication between the emergency reservoir and the brake pipe thereby to accelerate the build-up of pressure therein and thus to accelerate restoration of said service portion from its brake application position to its brake release position.

6. A fluid pressure brake equipment, as claimed in claim 5, further characterized in that said accelerated release mechanism is embodied in a casing section which constitutes one of a number of sectionalized casing sections of said brake controlling valve device.

7. In a fluid pressure brake equipment, the combination with a brake pipe, of an emergency reservoir, an auxiliary reservoir, a salvaged brake controlling valve device sectionalized casing having three sections, and an accelerated release mechanism comprising a casing carried by the brake controlling valve device casing between two adjacent sections thereof, said accelerated release mechanism having two chambers charged with fluid at brake pipe pressure and auxiliary reservoir pressure, respectively, a valve operative to vent fluid under pressure from the emergency reservoir to the brake pipe for effecting equalization of pressure therebetween to effect an accelerated increase in the brake pipe pressure, a one-way flow control means controlling the flow of fluid under pressure from said valve to said brake pipe, and a movable abutment subject to the opposing pressure in said two chambers and operative upon an increase in brake pipe pressure above auxiliary reservoir pressure to operate said valve.

8. A fluid pressure brake equipment, as claimed in claim 7, further characterized in that said one-way flow control means comprises a check valve device operative to open in the direction to establish a communication between said valve and said brake pipe and to close in an opposite direction.

9. In a fluid pressure brake equipment, in combination, a brake pipe, an emergency reservoir, an auxiliary reservoir, a first check valve normally closing a fluid flow communication from said emergency reservoir to said brake pipe, a second check valve for preventing flow of fluid under pressure from said brake pipe through the fluid flow communication in the direction from said brake pipe to said emergency reservoir, charging communications providing for flow of fluid under pressure from said brake pipe to said reservoirs, a flexible diaphragm subject on one side to pressure in said brake pipe and on the opposite side to pressure of fluid in said auxiliary reservoir, spring means defining the normal closed position of said first check valve, and means interposed between said diaphragm and said first check valve and operated by said diaphragm upon an increase in brake pipe pressure above auxiliary reservoir pressure to open said first check valve.

10. In a fluid pressure brake equipment, in combination, a brake pipe, an emergency reservoir, an auxiliary reservoir, a first check valve normally closing a fluid flow communication from said emergency reservoir to said brake pipe, a second check valve for preventing flow of fluid under pressure from said brake pipe through the fluid flow communication in the direction from said brake pipe to said emergency reservoir, charging communications providing for flow of fluid under pressure from said brake pipe to said reservoirs, a flexible diaphragm subject on one side to pressure in said brake pipe and on the opposite side to pressure of fluid in said auxiliary reservoir, spring means defining the normal closed position of said first check valve, a brake controlling valve device, and spool valve means interposed between said diaphragm and said first check valve, said spool valve being operable to control a communication between said auxiliary reservoir and atmosphere via said brake controlling valve device whereby upon a chosen increase in brake pipe pressure above auxiliary reservoir pressure said diaphragm effects operation of said spool valve to unseat said first check valve and establish said communication between said auxiliary reservoir and atmosphere.

11. In a fluid pressure brake equipment, in combination, a brake pipe, an emergency reservoir, an auxiliary reservoir, a first check valve normally closing a fluid flow communication from said emergency reservoir to said brake pipe, a second check valve for preventing flow of fluid under pressure from said brake pipe through the fluid flow communication in the direction from said brake pipe to said emergency reservoir, charging communications providing for flow of fluid under pressure from said brake pipe to said reservoirs, a flexible diaphragm subject on one side to pressure in said brake pipe and on the opposite side to pressure of fluid in said auxiliary reservoir, spring means defining the normal closed position of said first check valve, a brake controlling valve device operable in response to variations in brake pipe pressure with respect to auxiliary reservoir pressure to a release position, and a service position, and operable from said service position to a lap position upon equalization of brake pipe pressure and auxiliary reservoir pressure, and a spool valve operatively connected to said diaphragm and interposed therebetween and said first check valve, said spool valve being operable to control in cooperation with said brake controlling valve device when in said service lap position a communication between said auxiliary reservoir and atmosphere whereby upon a first chosen increase in brake pipe pressure above auxiliary reservoir pressure said diaphragm effects movement of said spool valve to a first position to unseat said first check valve, and upon a second chosen increase in brake pipe pressure above auxiliary reservoir pressure, higher than said first chosen increase in brake pipe pressure, said diaphragm effects movement of said spool valve to a second position to establish said communication between said auxiliary reservoir and atmosphere via said brake controlling valve device when in said lap position.

12. In a fluid pressure brake, in combination, a brake pipe, an auxiliary reservoir, an emergency reservoir, a chamber charged from said brake pipe, a brake controlling valve device comprising valve means and an abutment subject on one side to auxiliary reservoir pressure and on the other side to brake pipe pressure in said chamber, said abutment being responsive to a reduction in brake pipe pressure in said chamber for operating the valve means from a release position to a service position to effect a service application of the brakes, a movable abutment subject on one side to brake pipe pressure and on the opposite side to auxiliary reservoir pressure, a pair of valves operated successively by said movable abutment upon movement of the abutment in response to an increase in brake pipe pressure above auxiliary reservoir, subsequent to a service brake application, one of said valves being effective on operation to vent fluid under pressure from the emergency reservoir to the brake pipe, and the other valve being effective on operation to vent fluid under pressure from the auxiliary reservoir to the atmosphere only when said valve means is in said service position, said reduction in auxiliary reservoir pressure being effective on said one side of said first mentioned abutment in cooperation with an increase in brake pipe pressure on said other side in response to operation of said one valve to vent fluid under pressure from the emergency reservoir to said brake pipe, to cause the quick return of said valve means from its said service position to its said release position.

13. The combination with a brake controlling valve structure comprising a service valve device, an emergency valve device and a pipe bracket having connections for a brake pipe, a brake cylinder, an auxiliary reservoir and an emergency reservoir and ported mounting faces for said service valve device and for said emergency valve device; of a ported filling piece interposed between said service valve device and its corresponding mounting face and serving to connect said service valve device with said pipe bracket and to afford branch connections with the brake pipe, auxiliary reservoir and emergency reservoir connections therein; and an accelerated release valve device mounted on said filling piece, said accelerated release valve device comprising a normally closed valve effective when operated to open position to establish communication between said branch connections of said emergency reservoir and said brake pipe, and fluid pressure operated means responsive to a certain low differential of pressure in said brake pipe over that in said auxiliary reservoir to open said valve.

14. A fluid pressure brake controlling valve device of the AB type for use in a fluid pressure brake system including a brake pipe, an auxiliary reservoir, an emergency reservoir and a brake cylinder, said brake controlling valve device comprising a multi-section casing, one of which sections is a pipe bracket portion and another of which is a service portion, the service portion having embodied therein a service valve and a diaphragm type piston for operating said service valve responsively to differentials in pressure between the brake pipe and the auxiliary reservoir pressures to which it is opposingly subjected for controlling supply of fluid under pressure from the auxiliary reservoir to the brake cylinder and the release of fluid under pressure from the brake cylinder, a pair of abutting filling piece members interposed between said pipe bracket portion and said service portion and between which said diaphragm type piston is clampingly supported, and an accelerated release valve device supported by one of said filling piece members, said accelerated release valve device comprising a piston device subject in opposing relation to brake pipe pressure and auxiliary reservoir pressure and a valve operated by said piston device responsively to an increase in brake pipe pressure incident to a brake release operation following a service application for operating said valve to establish communication between the emergency reservoir and the brake pipe thereby to accelerate build-up of pressure in the latter and thus to accelerate the restoration of the service valve of the brake controlling valve device to a brake release position in which fluid under pressure is released from the brake cylinder.

15. An upgraded fluid pressure brake controlling valve device of the AB type as claimed in claim 13, further characterized in that said accelerated release valve device further comprises an additional valve which is operated by the piston device upon an increase in brake pipe pressure incident to initiation of a brake release following a service brake application to establish communication by which fluid under pressure is vented from the auxiliary reservoir to effect a reduction of pressure in the auxiliary reservoir relative to that in the brake pipe thereby to insure operation of the service valve of the brake controlling valve device to a brake release position.

16. A fluid pressure brake controlling valve device of the AB type for use in a fluid pressure brake system including a brake pipe, an auxiliary reservoir, an emergency reservoir and a brake cylinder, said brake controlling valve device comprising:
(a) a multi-section casing, one of which sections is a pipe bracket portion and another of which is a service portion having embodied therein:
  (i) a service valve, and
  (ii) a diaphragm type piston subject to auxiliary reservoir pressure in a first chamber on one side thereof and subject to brake pipe pressure in a second chamber on the opposite side thereof, said diaphragm type piston being responsive to differentials in pressure between the brake pipe and auxiliary reservoir to effect operation of said service valve for controlling supply of fluid under pressure from the auxiliary reservoir to the brake cylinder and the release of fluid under pressure from the brake cylinder,
(b) a choke means controlling communication between said brake pipe and said second chamber,
(c) a pair of abutting filling piece members interposed between said pipe bracket portion and said service portion and between which said diaphragm type piston is clampingly supported, and
(d) an accelerated release valve device supported by one of said filling piece members, said accelerated release valve device comprising:
  (i) a piston device subject in opposing relation to brake pipe pressure and auxiliary reservoir pressure, and
  (ii) a valve operated by said piston device responsively to an increase in brake pipe pressure incident to a brake release operation following a service application for operating said valve to establish communication between the emergency reservoir and said second chamber and thence via said choke means between the emergency reservoir and the brake pipe thereby to accelerate build-up of pressure in said second chamber at a fast rate and in said brake pipe at a lesser rate and thus to accelerate the restoration of the service valve of the brake control valve device to a brake release position in which fluid under pressure is released from the brake cylinder.

References Cited by the Examiner
UNITED STATES PATENTS

| | | | |
|---|---|---|---|
| 2,215,347 | 9/40 | Cook et al. | 303—6b |
| 2,812,984 | 11/57 | McClure et al. | 303—35 |
| 2,830,850 | 4/58 | McClure et al. | 303—35 |
| 2,939,746 | 6/60 | Pickert | 303—70 |

ARTHUR L. LA POINT, *Primary Examiner.*
THEODORE G. CRAVER, EUGENE G. BOTZ,
*Examiners.*